United States Patent
Gauss et al.

[11] Patent Number: 6,089,261
[45] Date of Patent: Jul. 18, 2000

[54] DRAIN VALVE WITH COUNTERWEIGHT

[76] Inventors: Kreg Gauss, 11116 Pebble Garden La.; Todd Siverling, 11131 Pompey Ct., both of Austin, Tex. 78739; Paul Lee Danforth, Rte. 3, Box 228, Cedar Creek, Tex. 78612

[21] Appl. No.: 09/189,663

[22] Filed: Nov. 11, 1998

[51] Int. Cl.[7] .................................................. F16K 15/00
[52] U.S. Cl. ..................... 137/527.8; 137/527; 137/527.6
[58] Field of Search ................................ 137/527.8, 527, 137/527.4, 527.6, 527.2; 251/308

[56] References Cited

U.S. PATENT DOCUMENTS

| | | | |
|---|---|---|---|
| 187,002 | 2/1877 | Ganter | 137/527.8 |
| 274,149 | 3/1883 | Stewart | 137/527.8 X |
| 1,168,085 | 1/1916 | McKelvey | 137/527.8 X |
| 1,328,103 | 1/1920 | Ripple | 137/527.8 |
| 1,771,770 | 7/1930 | Bruno | 137/527.8 |
| 2,033,306 | 3/1936 | Schofield | 137/527.8 X |
| 2,297,060 | 9/1942 | Henry | 137/527.8 X |
| 4,384,672 | 5/1983 | Kutzner et al. | 137/527.8 X |
| 4,494,564 | 1/1985 | Lukacz | 137/527.8 X |

*Primary Examiner*—Denise L. Ferensic
*Assistant Examiner*—Joanne Y. Kim
*Attorney, Agent, or Firm*—Williams, Morgan & Amerson

[57] ABSTRACT

A drain system includes a drainpipe and a valve. The valve includes a first and second body and a counterweight assembly. The first body has a passage formed therethrough and is fluidically coupled to the drainpipe. The second body is pivotally coupled to the first body and is moveable between a first generally sealed position and a second unsealed position relative to the drainpipe. The second body has a top surface adapted to receive waste fluid thereon. The counterweight assembly is coupled to the second body and is positioned to produce a force urging the second body toward the first position. The second body is free to pivot toward the second unsealed position in response to the weight of the waste fluid exceeding the force applied by the counterweight assembly.

7 Claims, 2 Drawing Sheets

DRAIN VALVE WITH COUNTERWEIGHT

BACKGROUND OF THE INVENTION

1. Field of the Invention

This invention is generally directed to automatically operated drain valves, and, more particularly, to a drain valve operated by the use of a counterweight.

2. Description of the Related Art

Semiconductor devices are manufactured using a series of complex steps that normally employ a variety of chemicals in both liquid and gaseous form. These chemicals include some relatively corrosive liquids and gases, such as hydrochloric acid. Hydrochloric acid is not entirely consumed by the process of manufacturing the semiconductor devices, and thus must be disposed of. Commonly, special drain systems are included adjacent the manufacturing equipment so that liquids may be efficiently removed.

Ordinarily, conventional drain systems include a P-trap to prevent gases from escaping. The P-trap captures a small portion of the waste liquid and uses it to substantially seal the drainpipe at least from leakage of gas. However, in a drain system that is intended to handle volatile chemicals such as hydrochloric acid, P-traps may not be employed. For example, if the P-trap were to fill with hydrochloric acid during one step of the semiconductor manufacturing process, and then in a subsequent step water were introduced to the P-trap, an undesirable violent reaction could occur.

Since P-traps may not be used on these types of drain systems, corrosive gases may be re-introduced to the area via the drainpipe, or even transported to other areas by the drain system. The introduction of corrosive gases into the manufacturing environment has obvious environmental consequences, including damage to expensive and sensitive equipment.

The present invention is directed to overcoming or at least reducing the effects of one or more of the problems set forth above.

SUMMARY OF THE INVENTION

In one aspect of the present invention, a valve is provided with a first and second body and a counterweight assembly. The first body has a passage formed therethrough. The second body is pivotally coupled to the first body and is moveable between a first generally sealed position and a second unsealed position. The counterweight assembly is coupled to the second body to urge the second body toward the first position.

In another aspect of the present invention, a drain system includes a drainpipe and a valve. The valve includes a first and second body and a counterweight assembly. The first body has a passage formed therethrough and is fluidically coupled to the drainpipe. The second body is pivotally coupled to the first body and is moveable between a first generally sealed position and a second unsealed position relative to the drainpipe. The second body has a top surface adapted to receive waste fluids thereon. The counterweight assembly is coupled to the second body and is positioned to produce a force urging the second body toward the first position. The second body is free to pivot toward the second unsealed position in response to the weight of the waste water exceeding the force applied by the counterweight assembly.

BRIEF DESCRIPTION OF THE DRAWINGS

The invention may be best understood by reference to the following description taken in conjunction with the accompanying drawings, in which like reference numerals identify like elements, and in which.

Figure 1:
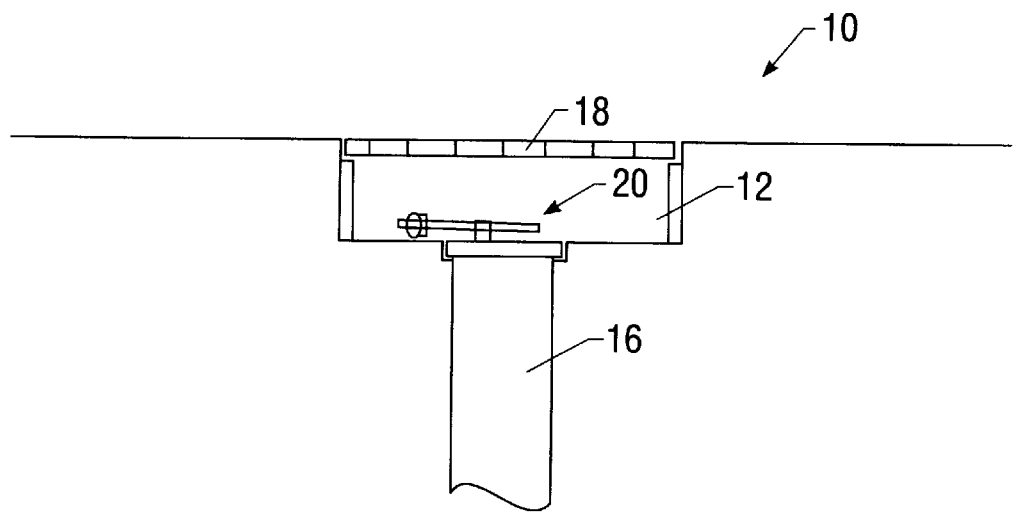
FIG. 1 illustrates a partial cross-sectional side view of a drain system employing an embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1, a partial cross-sectional side view of a portion of a drain system 10 is shown. The drain system 10 is located in, for example, a floor 12 of a semiconductor manufacturing facility (now shown). A recess 14 is formed in the floor 12 and interconnects with a drainpipe 16 on a bottom surface thereof. A grate 18 extends over the recess 12 to provide an area over which individuals may walk, while still allowing fluids to pass therethrough. A valve 20 is positioned in sealing arrangement between the drainpipe 16 and the recess 12, and is configured to allow the passage of fluid from within the recess 12 and into the drainpipe 16, but reduce the ability of the gas contained in the drainpipe 16 to enter the recess 12.

The valve 20 is configured to operate automatically upon the fluid level in the recess 12 reaching a preselected depth. That is, once the fluid level in the recess 12 rises to a preselected level, the valve 20 opens to transport the fluid in the recess 12 into the drainpipe 16. Thereafter, the valve 20 automatically closes, minimizing the amount of gas that can escape from the drainpipe 16 into the recess 12. As discussed in greater detail below, the preselected level at which the valve 20 operates may be readily adjusted to optimize the performance of the drain system. That is, where it is desired that as little fluid as possible be kept in the recess 12, then the preselected level may be set very low. On the other hand, where the amount of escaping gas is to be minimized, then it may be desirable to increase the amount of fluid held in the recess, as fewer operations may lead to less gas escaping.

Figure 2:
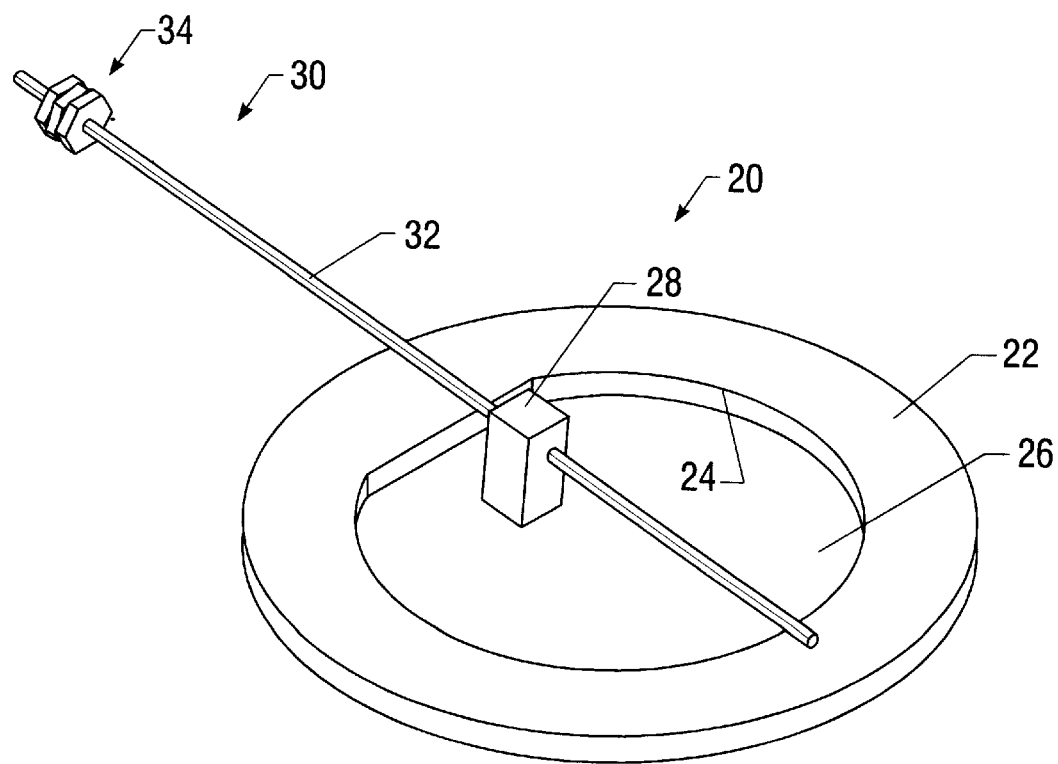
FIG. 2 illustrates a top perspective view of one embodiment of the present invention.

Turning now to FIG. 2, a top perspective view of an embodiment of the valve 20 is illustrated. The valve 20 includes a first body 22 that is generally ring-shaped and is in contact with the recess 12 and/or drainpipe 16. In some embodiments, the ring 22 is fixably attached to the recess 12 and/or drainpipe 16 to prevent or reduce the flow of fluid around its outer edges. A second body 26 generally seals a central opening 24 in the ring 22. The second body 26 is positioned in contact with a lower surface of the ring 22. The second body 26 includes a moment arm 28 extending from its top surface. The moment arm 28 may be integrally formed with the body 26, or may be separately formed and attached thereto. A counterweight assembly 30 is attached to the moment arm 28 and acts to urge the second body 26 into a generally sealing relationship with the ring 22.

A counterweight 30 includes a rod 32 connected to the moment arm 28 and extending a substantial distance therefrom. A series of weights 34 are coupled to a first end portion of the counterweight 32 separated from the moment arm 28 by a pre-selected distance. Thus, the weights 34 apply a force, due to gravity, in a generally downward direction at the distal end portion of the rod 32. The force generated by the weights 34 acts through the moment arm 28 in an upward direction to pull the body 26 firmly against the ring 22. The amount of force applied by the weights 34 may be adjusted by either manipulating the position of the weights 34, adjusting the number or magnitude of the weights 34, or adjusting the height of the moment arm 28. In the illustrated embodiment, the rod 32 is threaded along its length, as are the weights 34 and the moment arm 28. Thus, the position of the weights 34 may be readily adjusted by screwing/ unscrewing the weights along the rod 32 or the rod 32 into/out of the moment arm 28. It should be appreciated that the greater the magnitude of the weights 34 and the greater the distance between the weights 34 and the moment arm 28, the greater the force that will be exerted on the body 26.

The top surface of the body 26 receives the waste fluid thereon such that the weight of the waste fluid produces a force on the body 26 opposite to that produced by the counterweight 30. That is, as fluid collects in the recess 12, its weight pushes against the body 26. Once the weight of the fluid becomes greater than the force applied by the counterweight, the body 26 will unseal and release the collected fluid into the drainpipe 16. Therefore, by adjusting the force applied by the counterweight 30 the amount of fluid allowed to collect in the recess 12 may be controlled. Adding weights 34, or moving the weights 34 further from the moment arm 28, will prevent the valve 20 from operating until a greater amount of fluid collects in the recess 12. Conversely removing weights 34, or moving the weights 34 closer to the moment arm 28, will allow the valve 20 to operate at a lower fluid level within the recess 12.

Figure 3:
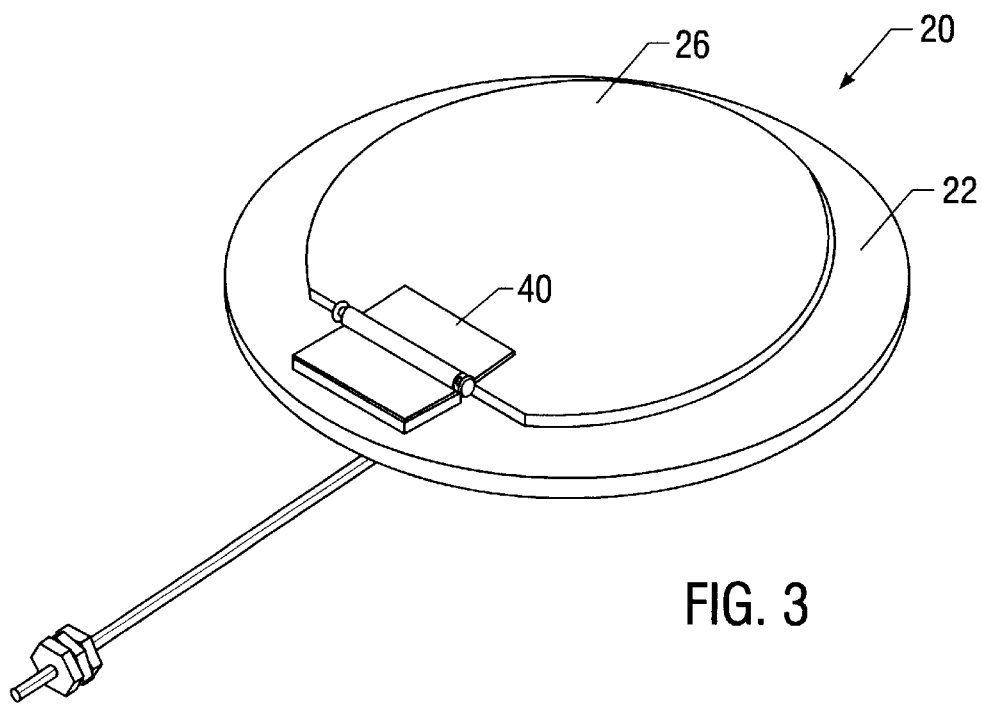
FIG. 3 illustrates a bottom perspective view of one embodiment of the present invention.

Referring now to FIG. 3, a bottom perspective view of the valve 20 is shown. A hinge 40 is coupled to the bottom surfaces of the body 26 and the ring 22 so as to provide pivotal movement between the body 26 and ring 22. The counterweight 30 produces an upward force on the body 26 because the weights 34 are positioned on a first side of the hinge 40 and the connection of the moment arm 28 to the body 26 is located on a second, opposite side of the hinge 40.

Figure 4:
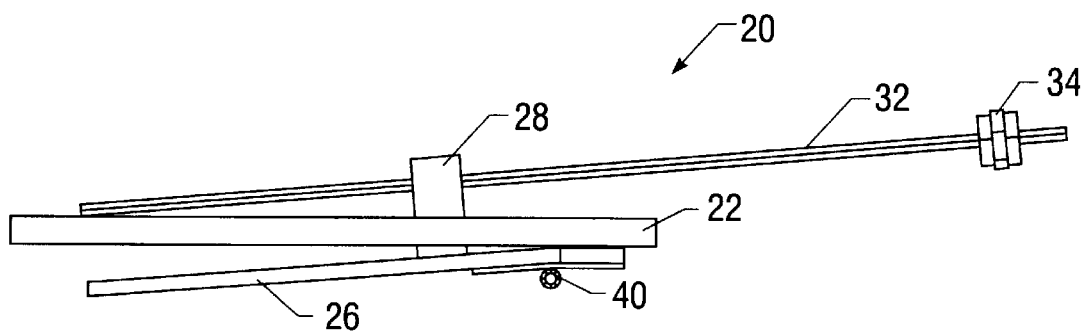
FIG. 4 illustrates a side view of one embodiment of the present invention in a first operating position.

FIG. 4 illustrates a side view of the valve 20 in a first operating position. That is, the valve 20 is shown in an open position with the body 26 displaced away from the ring 22 so that fluid may pass therethrough. The operation of the valve 20 to the position shown in FIG. 4 is affected by the weight of the fluid contained in the recess 12. That is, as the recess 12 begins to fill with fluid, the weight of the fluid overcomes the weight of the counterweights 34 to urge the body 26 to pivot about the hinge 40 and open the valve 20. Thus, as fluid becomes present in the recess 12, the valve 20 operates to introduce the fluid into the drainpipe 16. Once the fluid have been removed from the recess 12, the weight of the fluid is insufficient to operate the valve 20, and the weights 34 return the body 26 to sealing engagement with the ring 22, thereby minimizing the introduction of vapors contained in the drainpipe 16 into the recess 12.

The body 26 and the ring 22 can be made from any variety of rigid materials, but in cases where corrosive liquids are used, it is envisioned that a non-corrosive material may be employed, such as PVDF, PVC, etc.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A drain valve, comprising:
   a first body having a passage formed therethrough and fluidically coupled to a drainpipe;
   a hinge coupled to said first body;
   a second body pivotally coupled to said first body through said hinge and moveable between a first generally sealed position and a second unsealed position relative to said drainpipe; and
   a counterweight assembly separated from said hinge and being fixedly coupled to
   a top surface of said second body to urge said second body toward said first position.

2. A drain valve, as set forth in claim 1, wherein said counterweight assembly includes a moment arm coupled to said second body, and a weight coupled to said moment arm.

3. A drain valve, as set forth in claim 1, wherein said counterweight assembly includes a moment arm coupled to and extending from said second body adjacent a first side of said pivotal coupling, and a weight coupled to said moment arm and positioned adjacent a second opposite side of said pivotal coupling.

4. A drain valve, as set forth in claim 1, wherein said top surface of said second body is adapted to receive waste fluid thereon, and said second body is free to pivot toward said second unsealed position in response to the weight of the waste fluid exceeding the force applied by the counterweight assembly.

5. A drain system, comprising:
   a drainpipe; and
   a valve, including:
     a first body having a passage formed therethrough and fluidically coupled to said drainpipe;
     a hinge coupled to said first body;
     a second body pivotally coupled to said first body through said hinge and moveable between a first generally sealed position and a second unsealed position relative to said drainpipe, said second body having a top surface adapted to receive waste fluid thereon; and a counterweight assembly separated from said hinge and being fixedly coupled to said top surface of said second body and positioned to produce a force urging said second body toward said first position;

said second body being free to pivot toward said second unsealed position in response to the weight of the waste fluid exceeding the force applied by the counterweight assembly.

6. A drain valve, as set forth in claim 5, wherein said counterweight assembly includes a moment arm coupled to said second body, and a weight coupled to said moment arm.

7. A drain valve, as set forth in claim 5, wherein said counterweight assembly includes a moment arm coupled to and extending from said second body adjacent a first side of said pivotal coupling, and a weight coupled to said moment arm and positioned adjacent a second opposite side of said pivotal coupling.

* * * * *